(12) United States Patent
Schweikert et al.

(10) Patent No.: US 7,374,252 B2
(45) Date of Patent: May 20, 2008

(54) WHEEL SLIP BRAKE ASSURANCE MODULE

(75) Inventors: David E. Schweikert, Duncan, SC (US); Robert N. Scharpf, Greer, SC (US); James A. Wood, Spartanburg, SC (US)

(73) Assignee: Wabtec Holding Corporation, Wilmerding, PA (US)

( * ) Notice: Subject to any disclaimer, the term of this patent is extended or adjusted under 35 U.S.C. 154(b) by 272 days.

(21) Appl. No.: 11/376,902

(22) Filed: Mar. 16, 2006

(65) Prior Publication Data

US 2007/0216223 A1 Sep. 20, 2007

(51) Int. Cl.
*B60T 13/74* (2006.01)
*B60T 8/34* (2006.01)
*B60T 15/02* (2006.01)

(52) U.S. Cl. .............. 303/3; 303/7; 303/118.1; 303/176; 303/68; 303/135; 188/153 R

(58) Field of Classification Search .............. 303/3, 303/7, 14, 25, 26, 27, 68, 176, 128, 131, 303/132, 133, 135, 125, 126, 113.1, 115.1, 303/118.1, 119.1; 188/110, 112 R, 124, 188/153 R
See application file for complete search history.

(56) References Cited

U.S. PATENT DOCUMENTS

| | | | |
|---|---|---|---|
| 3,717,385 A * | 2/1973 | Michellone et al. ..... | 303/119.1 |
| 3,874,744 A * | 4/1975 | Huber ..................... | 303/118.1 |
| 3,924,902 A | 12/1975 | Engle | |
| 3,944,290 A * | 3/1976 | Goebels et al. .......... | 303/118.1 |
| 3,985,397 A | 10/1976 | Cannon | |
| 4,598,953 A | 7/1986 | Wood et al. | |
| 4,999,779 A | 3/1991 | Wood et al. | |
| 5,133,593 A * | 7/1992 | Woerner ................. | 303/118.1 |
| 5,244,171 A | 9/1993 | Drake et al. | |
| 5,738,417 A | 4/1998 | Wood et al. | |
| 5,788,339 A | 8/1998 | Wood et al. | |
| RE36,036 E | 1/1999 | Engle | |
| 5,887,953 A | 3/1999 | Wood et al. | |
| 5,975,656 A | 11/1999 | Schweikert et al. | |
| 6,698,848 B1 | 3/2004 | Corvin et al. | |
| 6,945,611 B2 | 9/2005 | Mayer et al. | |
| 7,226,135 B2 * | 6/2007 | Barberis ................. | 303/7 |
| 7,273,136 B2 * | 9/2007 | Goto et al. .............. | 303/89 |
| 2007/0236077 A1 * | 10/2007 | Schweikert et al. ..... | 303/7 |

FOREIGN PATENT DOCUMENTS

DE 11 76 176 B 8/1964
DE 20 19 667 A1 11/1971

* cited by examiner

*Primary Examiner*—Thomas J Williams
(74) *Attorney, Agent, or Firm*—The Webb Law Firm

(57) ABSTRACT

A wheel slip assurance module comprises a device for disabling the wheel slip valve, a timing reservoir in communication with the disabling device, and a check valve and choke circuit providing parallel connections between the output of the wheel slip valve and the timing reservoir having a first connection path comprising a check valve and charging choke and a second connection path comprising a dissipating choke such that flow from the output of the wheel slip valve passes through the check valve and charging choke to charge the reservoir when the brake cylinders are pressurized and opposite flow passes through the dissipating choke allowing the reservoir to discharge when the brake cylinders are exhausted.

3 Claims, 3 Drawing Sheets

WHEEL SLIP BRAKE ASSURANCE MODULE

BACKGROUND OF THE INVENTION

1. Field of the Invention

This invention relates to wheel slip control safety timers that can suspend a wheel slip control operation.

2. Description of Related Art

It is well known in the brake control art that modern train brake control systems typically use a central controller unit to control the brakes of the rail vehicles that comprise the train. A train operator located in the lead cab manipulates the brake handles or like devices of the train to apply and release the brakes of the trucks or bogies on each rail vehicle as desired. The inputs from the brake handles are typically processed by a cab control unit and passed to the central controller unit. In response to these and other inputs, the central controller unit issues a brake command signal along a train line to each of the rail vehicles in the form of either a pneumatic signal or an electrical signal or even both. Brake equipment on each of the rail vehicles applies or releases the brakes according to the dictates of the particular brake command signal received. The central controller unit sends the brake command signal to each of the rail vehicles along either a pneumatic train line or an electrical train line.

Depending on the type of train being considered, the brake equipment on each rail vehicle may include either exclusively pneumatic equipment or a combination of electrical and pneumatic (i.e., electro-pneumatic) equipment. Each rail vehicle typically includes a local control system whose construction and operation are generally well known in the brake control art. The local control system on each rail vehicle receives the brake command signal and various other signals in response to which it directly controls electro-pneumatic equipment according to principles well known in the brake control art. Specifically, the local control system generates the electrical signals which open or close the various valves which supply pressure to or vent pressure from the brake cylinders. The brakes on each rail vehicle apply and release accordingly.

The prior art brake control systems typically provide service braking, emergency braking, and wheel slip control functions. The local control system includes a microprocessor-based device which performs service brake control, limited emergency brake control, and wheel slip control. Associated with the brakes on each bogie is a Brake Cylinder Control Unit (BCCU) which manipulates brake cylinder pressure based on pneumatic and/or electrical inputs from the local control unit. It provides service and emergency brake cylinder pressure control as well as wheel slip brake cylinder pressure modulation. The BCCU has integrated magnet valves and transducers which are monitored and controlled by the local control unit.

A common element of the BCCU is a wheel slip valve which functions to adjust the brake cylinder air pressure available to that which adhesion between wheel and rail will support. Typically, an external sensing device transmits electrical signals to the coils of magnet valves controlling pilot pressure to lap (maintain) and release valves. When the release coil is energized, the supply of air to the brake cylinders is cut off and the air from the brake cylinders is vented to atmosphere. When the braking effort has decreased by a sufficient amount, the external wheel slip sensing device serves to effect a lap or maintaining of brake cylinder pressure by energizing the lap coil.

Prior to this invention, the reduction of brake control pressure for wheel slip conditions was either inhibited or monitored by a hardware electronic safety timer. Safety timers for use with wheel slip control are known in the art, for example, as disclosed in U. S. Pat. No. 6,698,848. Depending on the configuration of the service brake components and wheel slip components, improvements in the existing safety timers are desirable.

SUMMARY OF THE INVENTION

It is an object of this invention to provide a system to ensure that brake cylinder pressure is available in the event that wheel slip control is not effective or inoperative due to hardware and/or software component failure. It is a further object of this invention to provide a pneumatic assurance module for independently monitoring and controlling brake cylinder pressure as controlled by the wheel slip valve. It is a still further object of this invention to ensure that wheel slip control is limited against extended periods of brake pressure reduction without appropriate periods of brake application.

Briefly, according to this invention, there is provided an improvement in a pneumatic brake cylinder control circuit for controlling the supply of pressurized air to brake cylinders. In a pneumatic brake cylinder control circuit for controlling the supply of pressurized air to brake cylinders, the circuit has a main source of pressurized air and a wheel slip circuit comprising a wheel slip valve having two magnet valves for directing flow from a pilot pressure port to pneumatically-actuated release and lap valves. The wheel slip valve connects a source of brake control pressure to the brake cylinders, exhausts the cylinders, or maintains the pressure in the cylinders in response to electrical signals from a wheel slip sensing unit.

The improvement according to this invention is a pneumatic timing circuit controlled by the pressure at the output of the wheel slip valve. The pneumatic pressure at the output of the wheel slip valve charges and discharges the pneumatic timing circuit. When the pressure in the pneumatic timing circuit has discharged to a selected level based upon the average brake cylinder pressure controlled by the wheel slip valve, the timing circuit sends a pneumatic or electrical signal to disable the wheel slip operation of the wheel slip valve permitting continued service or emergency braking.

The improvement according to one embodiment of this invention comprises a transfer valve controlled by a pilot port. The transfer valve in a first position connects the pilot pressure port of the wheel slip valve to the main source of pressurized air and in a second position connects the pilot pressure port of the wheel slip valve to an exhaust port. The transfer valve is biased in the disabled position to connect the pilot port of the wheel slip valve to exhaust thereby disabling control of the lap and release valves. In this condition, the wheel slip valve is biased to pass braking pressure to the brake cylinders. A timing reservoir is in communication with the pilot port of the transfer valve. A check valve and choke circuit provides parallel connections between the output of the wheel slip valve and the timing reservoir and has a first connection path comprising a check valve and charging choke and a second connection path comprising a dissipating choke such that flow from the output of the wheel slip valve passes through the check valve and charging choke to charge the reservoir when the brake cylinders are pressurized and opposite flow passes through the dissipating choke allowing the reservoir to discharge when the brake cylinders are exhausted. Thus, if the reservoir pressure falls below the pilot pressure that holds the transfer valve in the enabled position, the pilot pressure of the wheel slip valve will be exhausted and slip control will be interrupted.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
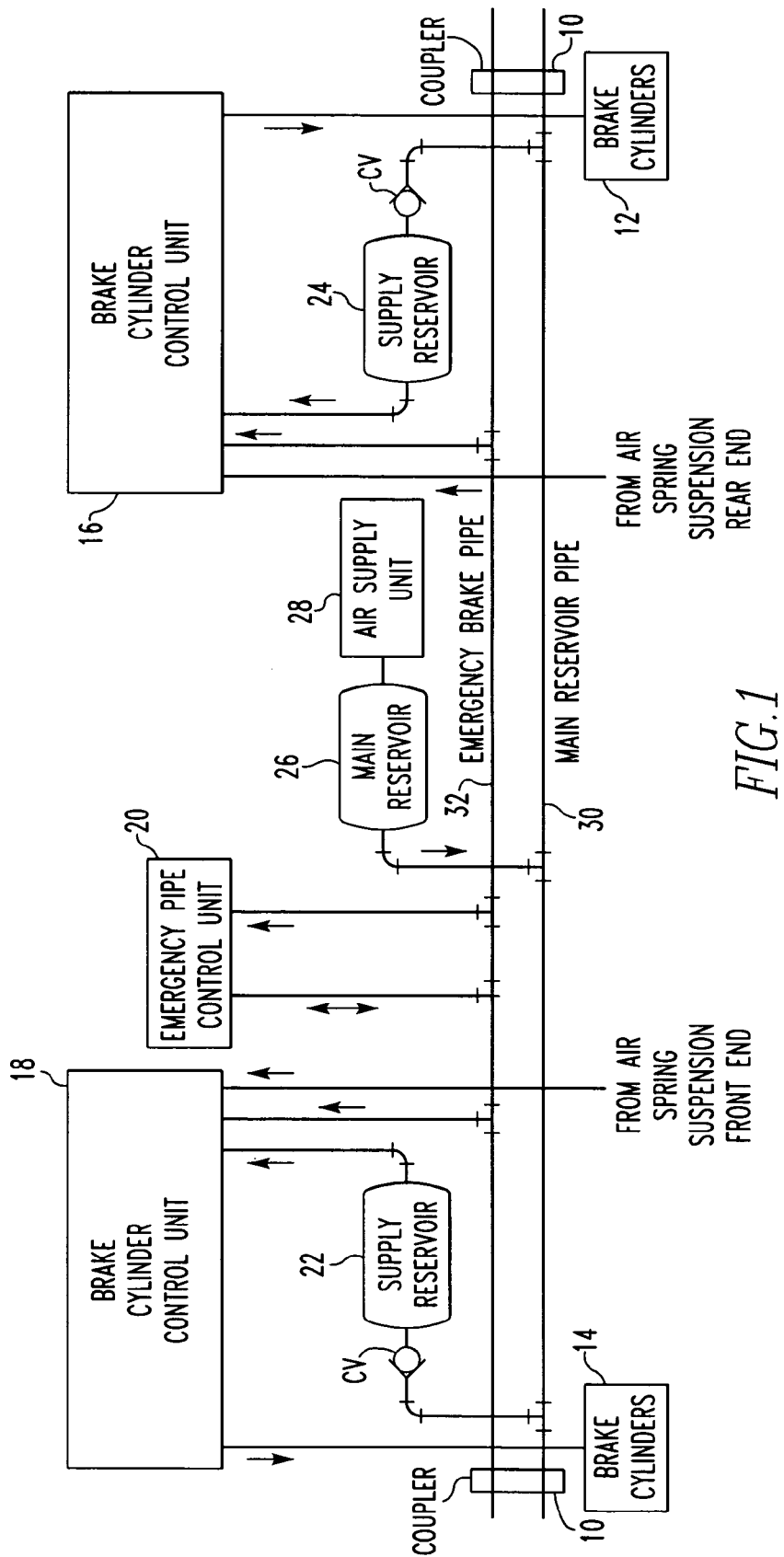
FIG. 1 is a much simplified schematic of an exemplary braking system on a transit vehicle in which the improvement of this invention can be implemented.

Referring now to FIG. 1, the transit vehicle has a coupler 10 at each end that mechanically couples adjacent vehicles and provides coupling of the emergency brake pipe 32 and main reservoir pipe 30, as well as electrical train lines. The main reservoir and emergency (brake) pipe are the source of pneumatic pressure for implementing service and emergency braking. The pipes, along with the electrical train line, implement the combined electrical and pneumatic (electro-pneumatic) braking control.

As shown in FIG. 1, the transit vehicle has brake cylinders 12, 14, for each truck of the car for actuating brakes, such as disc or tread-type brakes, associated with each wheel axle. Each truck's brakes are controlled primarily by a Brake Cylinder Control Unit (BCCU) 16, 18. The BCCUs respond to service braking commands and emergency braking commands generated by local control systems, such as the Emergency Pipe Control Unit (EPCU) 20, friction brake control units, and train line control signals, which are known in the art. These components respond to electrical and pneumatic signals from both train line controls and local controls. The BCCUs are connected to local supply reservoirs 22, 24 which are charged by the main reservoir pipe 30. The output of the BCCUs is brake cylinder pressure which is transmitted to the brake cylinders. The emergency pipe pressure from the EPCU is for emergency brake operations. The main reservoir pipe 30 is charged from the air supply unit 28, such as a compressor and the main reservoir 26. The details described with reference to FIG. 1 are simply to provide the setting in which the wheel slip brake assurance module described hereafter functions. These details form no essential part of the present invention.

A typical control feature of the BCCU is a wheel slip control valve. Wheel slip control valves are known in the art. An example of a wheel slip control valve made and sold by the assignee of this invention is "D-1" Decelostat wheel slip valve.

Figure 4:
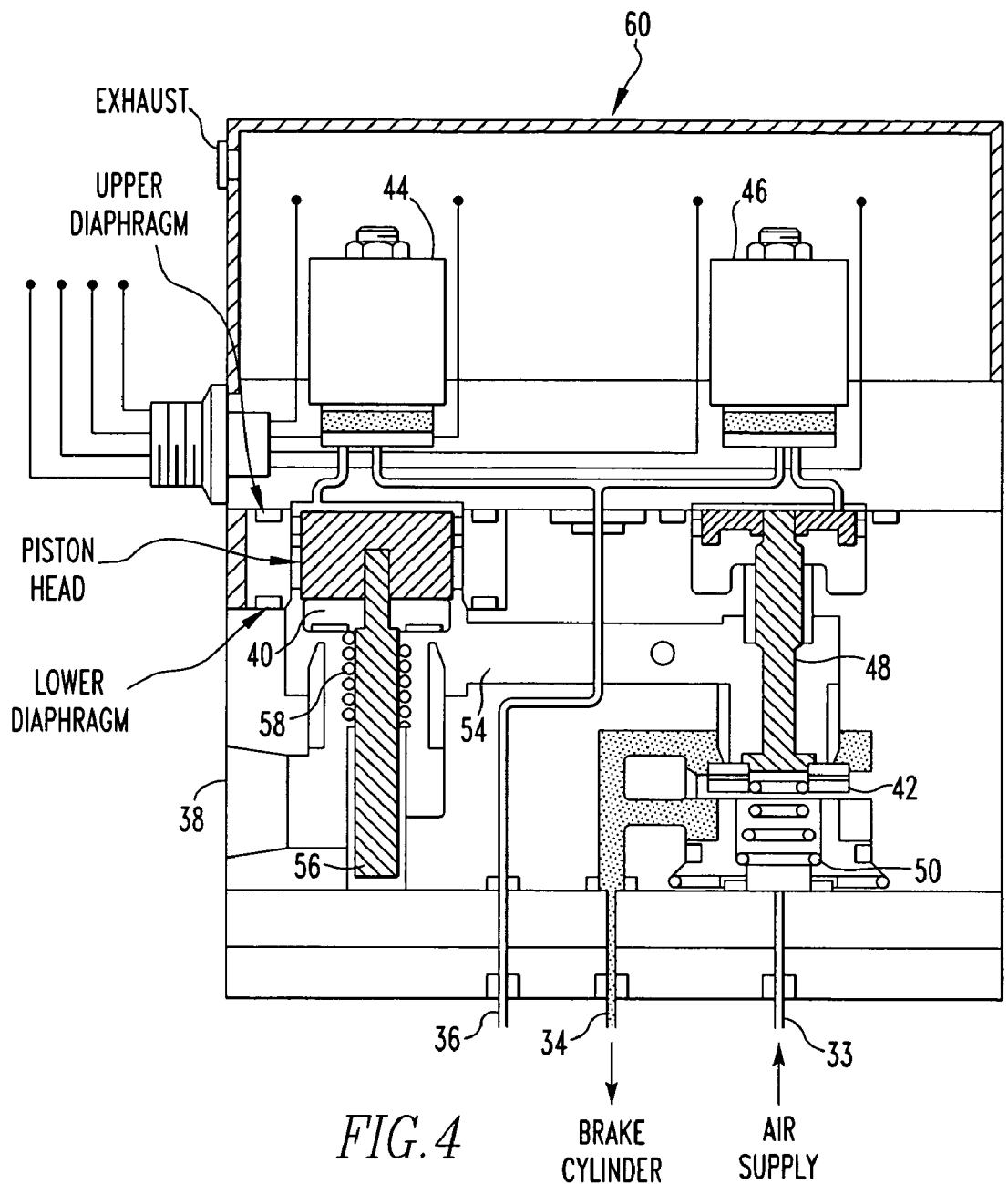
FIG. 4 is a schematic section through a wheel slip valve with which this invention may be used.

Referring to FIG. 4, the wheel slip valve has four pneumatic ports; namely, the braking pressure supply port 33, the brake cylinder port 34, the exhaust port 38 for exhausting the brake cylinders, and a pilot pressure port 36 connected to the main source of control pressure, for example, the control reservoir 30. The wheel slip valve has lap valve 40 and release valve 42 controlled by lap magnet valve 44 (solenoid operated) and release magnet valve 46 which control the pilot pressure for actuating the lap and release valves. The release valve has a piston rod 48 biased by a spring 50 to move release valve 42 to a first seat permitting supply from supply port 33 to the brake cylinders. This is the normal mode of the wheel slip valve. Pneumatic pressure to the supply port is controlled by other elements of the BCCU. In a second position, the release valve 42 is moved to seat in a position that closes the supply port 33 and opens the brake cylinder port 34 to the exhaust chamber 54. A second piston rod 56 is biased by spring 58 to allow communication between the exhaust chamber 54 and the exhaust port 38.

The release magnet valve 46, when energized, conducts pilot pressure to a rolling diaphragm that overcomes the bias on the piston rod 48, thus switching the release valve 42 to the exhaust (released) position. When the lap magnet valve 44 is energized, the exhaust chamber 54 is sealed from exhaust port 38. Thus, depending on the energized states of the magnet valves, the brake cylinders can be connected to a braking pressure supply, exhausted or maintained at pressure sealed from both the supply and exhaust.

Figure 2:
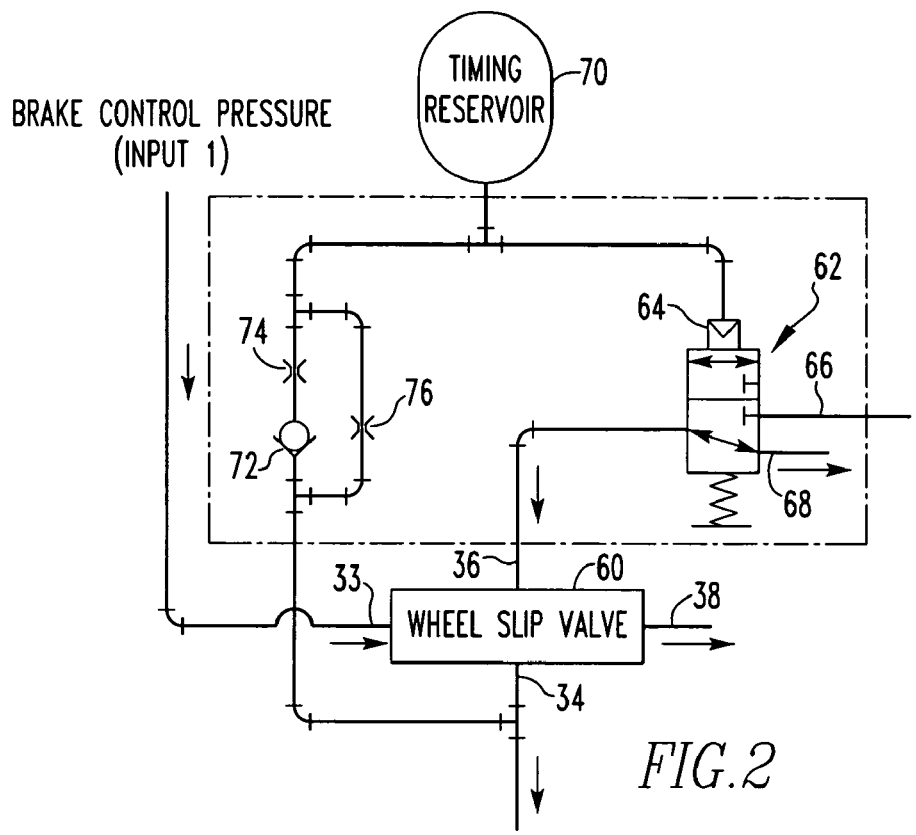
FIG. 2 is a schematic diagram of the wheel slip brake assurance module according to this invention.

Referring now to FIG. 2, there is shown a wheel slip brake assurance module according to one embodiment of this invention. The wheel slip valve 60 is shown with connections to each of the braking pressure supply port 33, the brake cylinder port 34, the exhaust port 38, and the pilot pressure port 36.

A transfer valve 62 is controlled by a pilot port 64. The transfer valve in a first position connects the pilot pressure port 36 of the wheel slip valve 60 to the main source of pressurized air 66 and in a second position connects the pilot pressure port of the wheel slip valve to exhaust 68. The transfer valve is biased in the first position to connect the pilot pressure port 36 of the wheel slip valve to exhaust, thereby disabling control of the lap and release valves of the wheel slip valve 60. In this condition, the wheel slip valve is biased to pass braking pressure to the brake cylinders.

A timing reservoir 70 is in communication with the pilot port 64 of the transfer valve 62. A check valve and choke circuit provides parallel connections between the brake cylinder port 34 of the wheel slip valve 60 and the timing reservoir 70 having a first connection path comprising a check valve 72, and charging choke 74 and a second connection path comprising a dissipating choke 76 such that flow from the brake cylinder port 34 of the wheel slip valve passes through check valve 72 and charging choke 74 to charge the timing reservoir 70 when the brake cylinders are pressurized and opposite flow passes through the dissipating choke 76 allowing the reservoir to discharge when the brake cylinders are exhausted. Thus, if the reservoir pressure falls below the pilot pressure that holds the transfer valve 62 in the first position, the pilot pressure of the wheel slip valve will be exhausted and slip control will be interrupted.

During release conditions, the timing reservoir 70 is depleted at a predictable rate. In brake demand conditions, the timer reservoir is charged and wheel slip control is reset variably as the brake control pressure increases. The reset rate and expiration period are functions of the brake control pressure level and the timing reservoir volume. The timing components, the reservoir size, the chokes, and the spring force in the transfer valve or a pressure switch setting used to control the slip valve can be selected to meet vehicle requirements and desired brake performance. The component selection will define the reset rate which ensures acceptable levels of brake pressure are achieved after extended periods of brake pressure reduction enforced by the slip valve. The sensitivity of the transfer valve spring pressure switch setting will define the level to which the brake control pressure can be reduced. The volume of the timing reservoir will define the period of time that a continuous reduction of pressure is allowed.

In the following table, exemplary details of a timing circuit are set forth.

TABLE 1

| Parameter | |
|---|---|
| Reservoir Volume | 90 in.$^3$ |
| Charging Choke Size | 0.160 in. |
| Dissipating Choke Size | 0.060 in. |
| Pilot Pressure to Overcome Bias on Transfer Valve | 25 psig |

Figure 3:
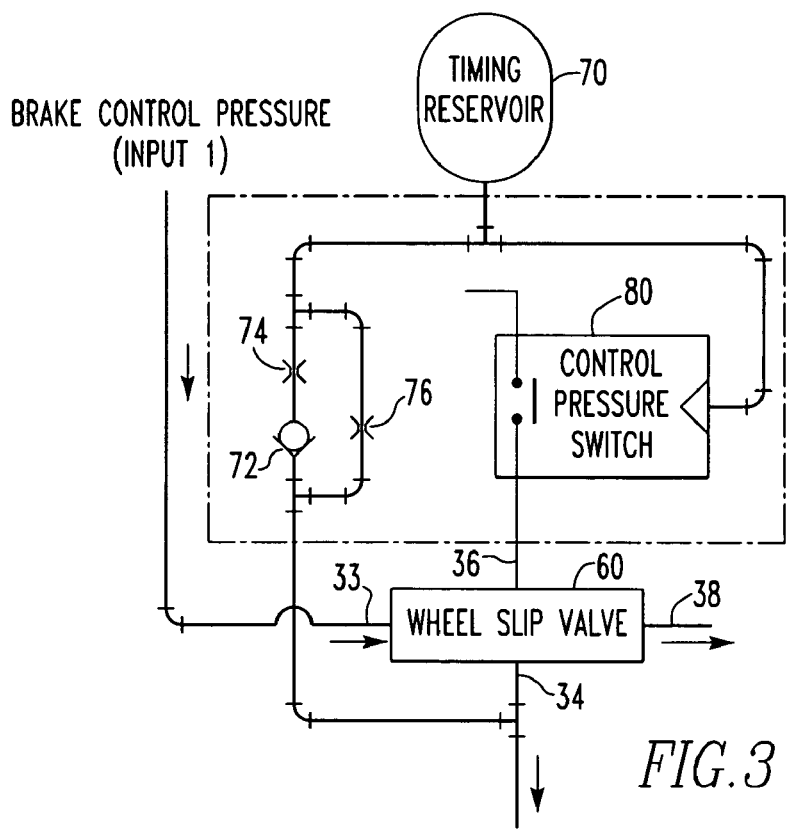
FIG. 3 is a schematic diagram of an alternate embodiment of a wheel slip brake assurance module according to this invention.

Referring now to FIG. 3, there is shown a wheel slip brake assurance module according to an alternate embodiment of this invention. In FIG. 3, the elements corresponding to those shown in FIG. 2 have the same numbers. The transfer valve 62 controlling the pilot pressure to the wheel slip valve has been replaced with a pressure-activated control pressure switch 80 that disconnects the electrical power supply to the magnet valves when pressure at a control port drops below a control pressure causing slip control to be interrupted.

Applicants' invention provides reduction in the brake level for a limited period of time and assures a period of brake recovery (application). It further provides a non-electronic system to return brake pressure to the required level.

Having thus described our invention with the detail and particularity required by the Patent Laws, what is desired protected by Letters Patent is set forth in the following claims.

The invention claimed is:

1. In a pneumatic brake cylinder control circuit for controlling the supply of pressurized air to brake cylinders, said circuit having a main source of pressurized air and a wheel slip circuit comprising a wheel slip valve having release and lap valves, said wheel slip valve connecting a source of brake control pressure to the brake cylinders, exhausting the cylinders, or maintaining the pressure in the cylinders in response to signals from a wheel slip sensing unit, the improvement comprising:
    means for disabling the wheel slip valve;
    a timing reservoir in communication with the disabling means; and
    a check valve and choke circuit providing parallel connections between the output of the wheel slip valve and the timing reservoir having a first connection path comprising a check valve and charging choke and a second connection path comprising a dissipating choke such that flow from the output of the wheel slip valve passes through the check valve and charging choke to charge the reservoir when the brake cylinders are pressurized and opposite flow passes through the dissipating choke allowing the reservoir to discharge when the brake cylinders are exhausted,
    whereby if the reservoir pressure falls below a control pressure, the disabling means will disable the wheel slip valve and slip control will be interrupted.

2. In a pneumatic brake cylinder control circuit for controlling the supply of pressurized air to brake cylinders, said circuit having a main source of pressurized air and a wheel slip circuit comprising a wheel slip valve having two magnet valves for directing flow from a pilot pressure port to pneumatically-actuated release and lap valves, said wheel slip valve connecting a source of brake control pressure to the brake cylinders, exhausting the cylinders or maintaining the pressure in the cylinders in response to electrical signals from a wheel slip sensing unit, the improvement comprising:
    a transfer valve controlled by a pilot port, said transfer valve in a first position connecting the pilot pressure port of the wheel slip valve to the main source of pressurized air and in a second position connecting the pilot pressure port of the wheel slip valve to an exhaust port, said transfer valve being biased in the second position to connect the main source of pressurized air to an exhaust port, the transfer valve being forced to the first position by a preset pilot pressure at the pilot port;
    a timing reservoir in communication with the pilot pressure port of the transfer valve; and
    a check valve and choke circuit providing parallel connections between the output of the wheel slip valve and the timing reservoir having a first connection path comprising a check valve and charging choke and a second connection path comprising a dissipating choke such that flow from the output of the wheel slip valve passes through check valve and charging choke to charge the reservoir when the brake cylinders are pressurized and opposite flow passes through the dissipating choke allowing the reservoir to discharge when the brake cylinders are exhausted,
    whereby if the reservoir pressure falls below the pilot pressure that holds the transfer valve in the first position, the pilot pressure of the wheel slip valve will be exhausted and slip control will be interrupted.

3. In a pneumatic brake cylinder control circuit for controlling the supply of pressurized air to brake cylinders, said circuit having a main source of pressurized air and a wheel slip circuit comprising a wheel slip valve having two magnet valves for directing flow from a pilot pressure port to pneumatically-actuated release and lap valves, said wheel slip valve connecting a source of brake control pressure to the brake cylinders, exhausting the cylinders or maintaining the pressure in the cylinders in response to electrical signals from a wheel slip sensing unit, the improvement comprising:
    a control pressure switch having a control port and means to open an electrical switch when the pressure at the control port drops below a control pressure;
    a timing reservoir in communication with the control port of the control pressure switch; and
    a check valve and choke circuit providing parallel connections between the output of the wheel slip valve and the timing reservoir having a first connection path comprising a check valve and charging choke and a second connection path comprising a dissipating choke such that flow from the output of the wheel slip valve passes through check valve and charging choke to charge the reservoir when the brake cylinders are pressurized and opposite flow passes through the dissipating choke allowing the reservoir to discharge when the brake cylinders are exhausted,
    whereby if the reservoir pressure falls below the control pressure, electrical power for activating the magnet valves is prevented from flowing to the magnet valves and slip control will be interrupted.

* * * * *